(12) United States Patent
Nguyen

(10) Patent No.: US 7,331,365 B2
(45) Date of Patent: Feb. 19, 2008

(54) LAVATORY SERVICE SHUT-OFF VALVE

(75) Inventor: Hung Nguyen, Painesville, OH (US)

(73) Assignee: Transdigm Inc., Richmond Hts., OH (US)

(*) Notice: Subject to any disclaimer, the term of this patent is extended or adjusted under 35 U.S.C. 154(b) by 93 days.

(21) Appl. No.: 10/505,756

(22) PCT Filed: Feb. 28, 2003

(86) PCT No.: PCT/US03/05993

§ 371 (c)(1),
(2), (4) Date: Aug. 26, 2004

(87) PCT Pub. No.: WO03/074915

PCT Pub. Date: Sep. 12, 2003

(65) Prior Publication Data

US 2005/0081951 A1    Apr. 21, 2005

(51) Int. Cl.
*B65B 1/30*    (2006.01)

(52) U.S. Cl. ...................... 141/198; 141/199; 137/434; 137/448

(58) Field of Classification Search .................. 251/65, 251/298–303; 137/237, 238, 246, 448, 527, 137/434; 141/198, 199
See application file for complete search history.

(56) References Cited

U.S. PATENT DOCUMENTS

| | | | |
|---|---|---|---|
| 3,476,355 A | 11/1969 | Sherwood | |
| 3,570,807 A | 3/1971 | Sturman et al. | |
| 4,732,190 A * | 3/1988 | Polselli | 137/460 |
| 4,844,113 A * | 7/1989 | Jones | 137/39 |
| 5,113,901 A * | 5/1992 | Young | 137/554 |
| 5,115,829 A * | 5/1992 | Franzke | 137/38 |
| 5,209,454 A * | 5/1993 | Engdahl et al. | 251/65 |
| 5,230,365 A | 7/1993 | Woltz et al. | |
| 5,307,837 A | 5/1994 | Woltz et al. | |
| 5,503,175 A * | 4/1996 | Ravilious et al. | 137/1 |
| 5,513,395 A | 5/1996 | Chlebek et al. | |
| 5,533,545 A | 7/1996 | Robinson | |
| 5,915,665 A | 6/1999 | Paese et al. | |
| 6,000,417 A | 12/1999 | Jacobs | |
| 6,017,016 A | 1/2000 | Jackson | |
| 6,112,764 A * | 9/2000 | Engdahl et al. | 137/554 |
| 6,550,495 B1 * | 4/2003 | Schulze | 137/614.2 |
| 6,722,405 B2 * | 4/2004 | Cessac et al. | 141/301 |
| 6,729,368 B2 * | 5/2004 | Nguyen | 141/199 |

* cited by examiner

*Primary Examiner*—Khoa D. Huynh
(74) *Attorney, Agent, or Firm*—Baker & Hostetler LLP

(57) ABSTRACT

A shut off valve (10) is provided for use in an aircraft lavatory system (70) during maintenance sanitizing operations. The shut off valve includes an inlet passage (20) in intermittent fluid communication with an outlet passage (30) and a magnetic flapper body (40) movable between a rest position and a seal position between said inlet passage and said outlet passage. The flapper body is moved by a magnetic actuator (60) whereby upon placing said magnetic actuator within the proximity of the flapper body, the flapper body is moved form the rest position and, with the assistance of fluid flow within the valve, into the seal position, thus preventing fluid communication between the inlet passage and the outlet passage.

8 Claims, 4 Drawing Sheets

LAVATORY SERVICE SHUT-OFF VALVE

PRIORITY

This is application claims priority to U.S. patent application Ser. No. 10/085,510, filed on Feb. 28, 2002, now U.S. Pat. No. 6,729,368, the disclosure of which is hereby incorporated by reference in its entirety.

FIELD OF THE INVENTION

This invention relates generally to fluid shut off valves and more specifically to an automatic shut off valve using magnetic actuation.

BACKGROUND OF THE INVENTION

The modern aircraft lavatory uses the flow of disinfectant fluid or a powerful pump to remove waste from a toilet into a waste holding tank. During ground maintenance the waste tank is emptied and sanitized. Sanitation is especially important to kill any infectious disease agents potentially carried in human waste. The emptying and sanitizing processes are typically performed by airport ground crews using a lavatory cart. The cart includes a supply of disinfectant fluid as well as a disposal tank. Disinfectant fluid is pumped into the aircraft waste holding tank after waste from the flight is drained.

In order to do an effective job of sanitizing the aircraft waste storage tank, it is desirable to fill the waste storage tank up to a specific level. Filling to a high level has many potential drawbacks if overfilling occurs. Overfilling can create spillage of disinfectant fluid, potentially contaminated with human waste. Spilled disinfectant fluid can freeze at high altitudes, creating solid projectiles, sometimes referred to as blue ice, which are potentially dangerous to the aircraft, especially its engines. Disinfectant fluid is harmful to the aircraft structure and electronics. Disinfectant fluid also includes a strong smelling detergent which when spilled on the interior of the aircraft via overfilling the toilet is objectionable, thus, it is desirable to minimize spills.

A valve which can automatically prevent overfilling of the waste holding tank is desired. An additional desire is to provide a valve with automatic shut off for use during the filling operation in combination with a backflow prevention device for use during normal operations.

SUMMARY OF THE INVENTION

The present invention is directed to an automatic shut off valve and to an aircraft lavatory system which may be sanitized while avoiding any overfilling of the sanitary waste holding tank.

In one embodiment the invention provides a shut off valve for regulating fluid flow which includes an inlet passage in intermittent fluid communication with an outlet passage, a magnetic flapper body movable between a rest position and a seal position between the inlet passage and the outlet passage and a magnetic actuator that moves the flapper body toward a seal position, thus, preventing fluid communication between the inlet passage and the outlet passage.

In another embodiment the invention provides a lavatory system for use on an airplane which includes one or more toilets, each toilet including a drain passage for disposal of sanitary wastes. The system also includes a waste tank attached to the drain passages from said toilets, a shut off valve for regulating flow of disinfectant fluid used to rinse the waste tank, a vertically canted tube in fluid communication with the waste tank, and a magnetic float within the tube whereby the float rises and falls in response to level changes within the waste tank. The shut off valve includes an inlet passage in intermittent fluid communication with an outlet passage, which directs fluid to the waste tank. The valve also includes a magnetic flapper body movable between a rest position and a seal position between the inlet passage and the outlet passage. When a predetermined level is reached in the waste tank, the magnetic float comes within the proximity of the magnetic flapper body, and the flapper body is moved from a rest position and, with the assistance of fluid flow pressure into a seal position.

The present invention provides numerous advantages not realized in the prior art. First, the invention provides a no-spill filling system, thus, avoiding potential freezing of spilled fluid and avoiding the problems associated with a spilled, highly aromatic and corrosive fluid. The invention also provides a shut off valve which may be actuated magnetically, avoiding the need for a mechanical actuator. As a result, the valve may be constructed with fewer parts and seals which minimizes potential failures. Additionally, the shut off valve within the system functions automatically thereby eliminating the need for airline ground crews to consistently check the level of disinfectant fluid being fed into the waste tank during sanitizing operations. Thus, the valve serves as a backup if the ground crew forgets to shut off the inlet supply at the appropriate level from the truck.

These and other features, aspects and advantages of the present invention will be fully described by the following description, appended claims, and accompanying drawings.

DETAILED DESCRIPTION OF THE INVENTION

Figure 1:
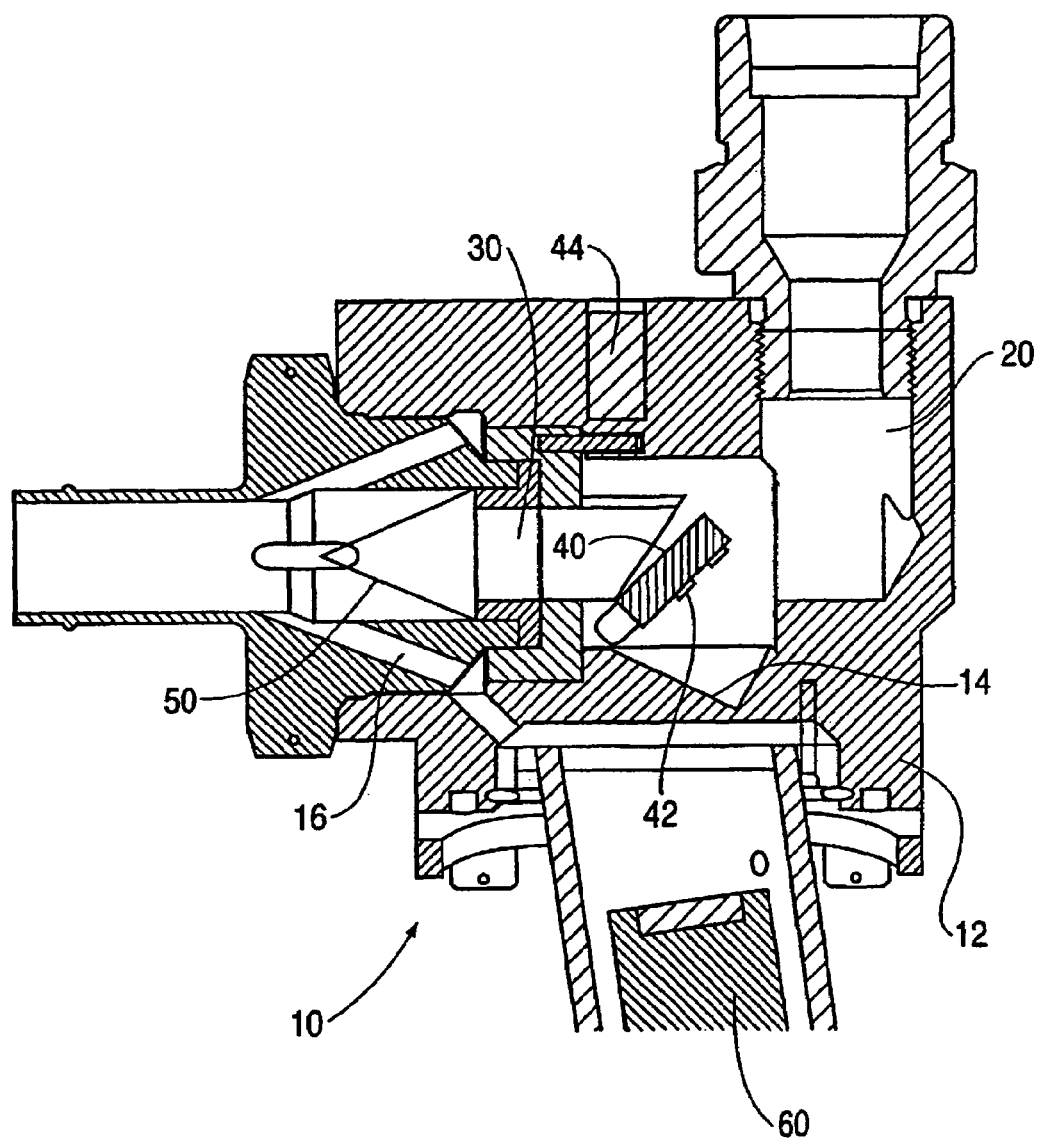
FIG. 1 is a cutaway view of the shut off valve.

Referring to FIG. 1 a shut off valve 10 is shown for use in an aircraft lavatory system. The shut off valve 10, as described in more detail below, functions to prevent overfilling of a waste tank with disinfectant fluid.

The shut off valve 10 includes a valve body 12. The valve body 12 may be made from non-magnetic, non-corrosive materials having characteristics of high strength. The shut off valve 10 includes an inlet passage 20 through which disinfectant fluid enters the shut off valve 10 and an outlet passage 30 through which disinfectant fluid exits the shut off valve 10. The shut off valve includes a flapper body 40 situated within the inlet passage 20 which regulates the intermittent fluid communication between the inlet passage 20 and the outlet passage 30. When the flapper body 40 is in a rest position, fluid may pass from the inlet passage 20 into the outlet passage 30. When the flapper body 40 is in a seal position, fluid is prevented from passing from the inlet passage 20 into the outlet passage 30.

The flapper body 40 is a magnetic piece which has the ability to block the outlet passage 30. The flapper body 40 may be manufactured from a magnetic material or may be manufactured from a non-magnetic material and have one or more magnets 42 attached to its surface. The flapper body is hinged at one end to the shut off valve body 12 allowing the flapper body 40 to rotate from a rest position to a seal position. The seal position has the flapper body 40 covering the outlet passage 30. The rest position has the flapper body 40 resting upon the valve body 12. The valve body 12 may be manufactured with a cavity 14 which provides a place for the flapper body 40 to rest. The size and shape of the cavity are designed based on numerous factors including the flowrate of fluid through the valve 10, the density of the fluid, the flapper body 40 shape, the weight of the flapper body 40, and length and orientation of the inlet passage 20. When the flapper body 40 is within the cavity 14 the flow of fluid in the inlet passage 20 is not disturbed.

The shut off valve 10 may also include a check valve 50. The check valve 50 functions to prevent back flow of any fluid, namely human waste within the waste tank during normal, non-sanitizing operations. These materials can hinder the function of the flapper body 40. The check valve 50 may be situated within or adjacent to either the inlet passage 20 or the outlet passage 30. The check valve 50 may be any type known in the art-including ball check and flapper check types. The check valve 50 may be manufactured as part of the valve body 12 or alternatively may be a fitting which is able to attach to the valve body 12.

The shut off valve 10 includes a magnetic actuator 60. The magnetic actuator 60 functions to move the flapper body 40 from its rest position. Movement occurs when the magnetic actuator 60 is brought into close proximity to the flapper body 40. Magnetic forces between the magnetic actuator 60 and the flapper body 40 cause movement of the flapper body 40. In one embodiment of the invention repelling magnetic forces are used. In another embodiment (not illustrated) the flapper body 40 is situated on a fulcrum and attractive magnetic forces are used to move one end of the flapper body towards the magnetic actuator 60 while the other end rotates to seal the outlet passage 30. In one embodiment of the invention, the magnetic actuator 60 is a float. Rising and falling fluid levels move the magnetic actuator 60 into and out of proximity of the flapper body 40. In another embodiment of the invention the actuator 60 is not magnetic, but is a float which triggers a stationary electromagnet at a set level. The electromagnet then actuates the flapper body 40. There is no requirement for the magnetic actuator 60 to ever be in contact with the flapper body 40. Thus, the valve body 12 may be a sealed unit and as the magnetic actuator 60 approaches the outside of the valve body 12, the flapper body 40 is moved.

The valve body 12 may also include a reset magnet 44. The reset magnet 44 helps move or keep the flapper body 40 in a rest position when sealing of the outlet passage 30 is not desired. The reset magnet 44 generates a magnetic force which repels the flapper body 40 or magnets 42 thereupon. The reset magnet 44, due to its position or inherent magnetic force does not create a force which exceeds the force generated by a magnetic actuator 60 and the pressure of flow through the inlet passage 20. Thus, when the magnetic actuator 60 is in a proximal position, the force it generates can overcome the force generated by the reset magnet 44 and the flapper body 40 may be moved towards a seal position with the aid of the pressure of flow through the inlet passage 20. The valve body 12 may also be manufactured with a bypass passage 16. The bypass passage 16 directs a small amount of fluid through a different portion of the valve body 12 to provide rinsing of the float 60. The bypass passage flow rate depends on the backpressure created in the system when disinfectant fluid is being added to the waste tank.

Figure 2:
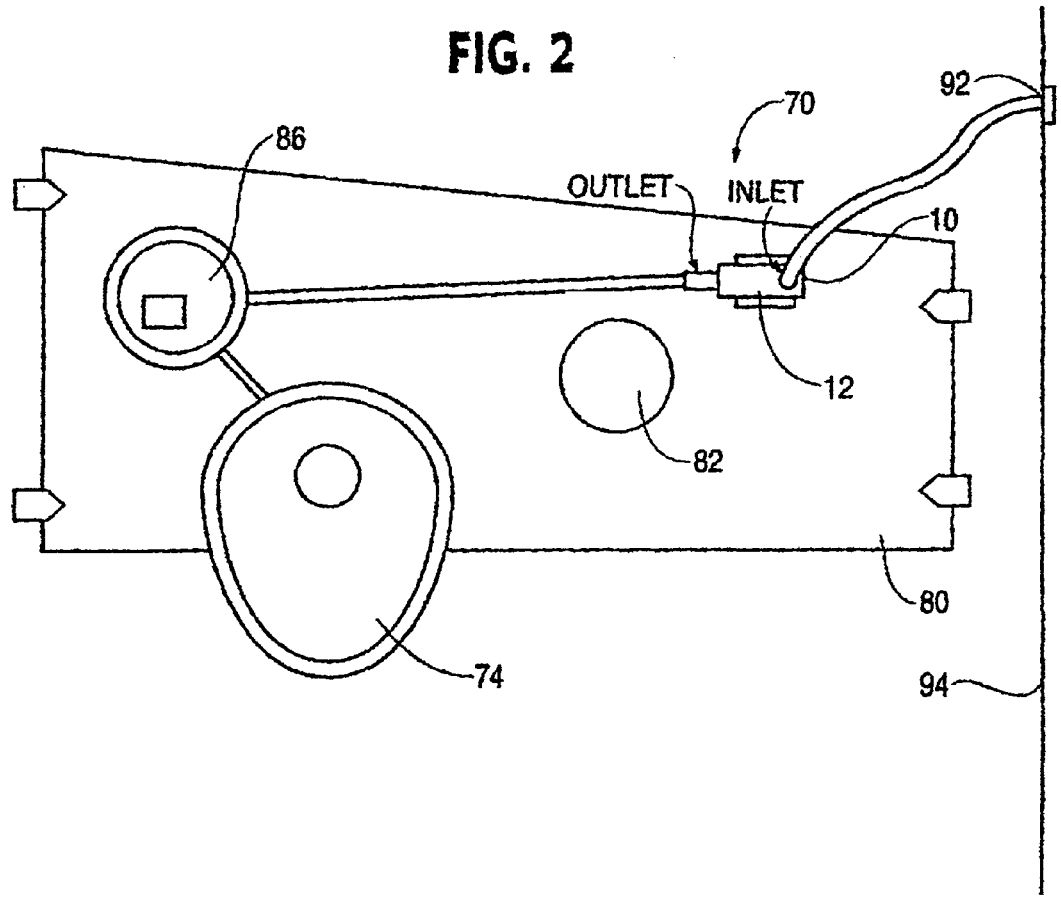
FIG. 2 is a schematic of the layout of an aircraft lavatory.

The shut off valve 10 may be used as part of a lavatory system 70 on an airplane as shown in FIG. 2. The system 70 includes one or more toilet bowls 74, a waste tank 80, a drain passage 82 for the waste tank 80, and a pump 86. The exterior wall of an aircraft 94 and connecting fixture 92 are shown as well in FIG. 2. Waste is deposited in the toilet 74 by aircraft passengers. Waste is flushed from the toilet 74 by disinfectant fluid pumped into the toilet 74 by pump 86 and into the waste tank 80.

Figure 3:
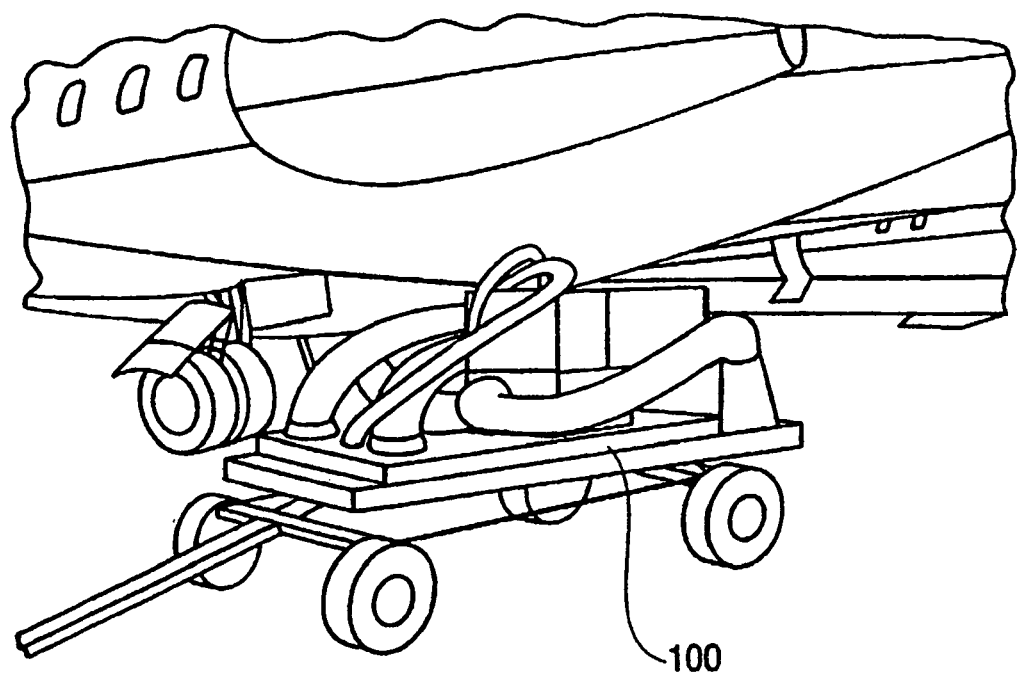
FIG. 3 is a perspective view of an aircraft and lavatory cart.
Figure 4:
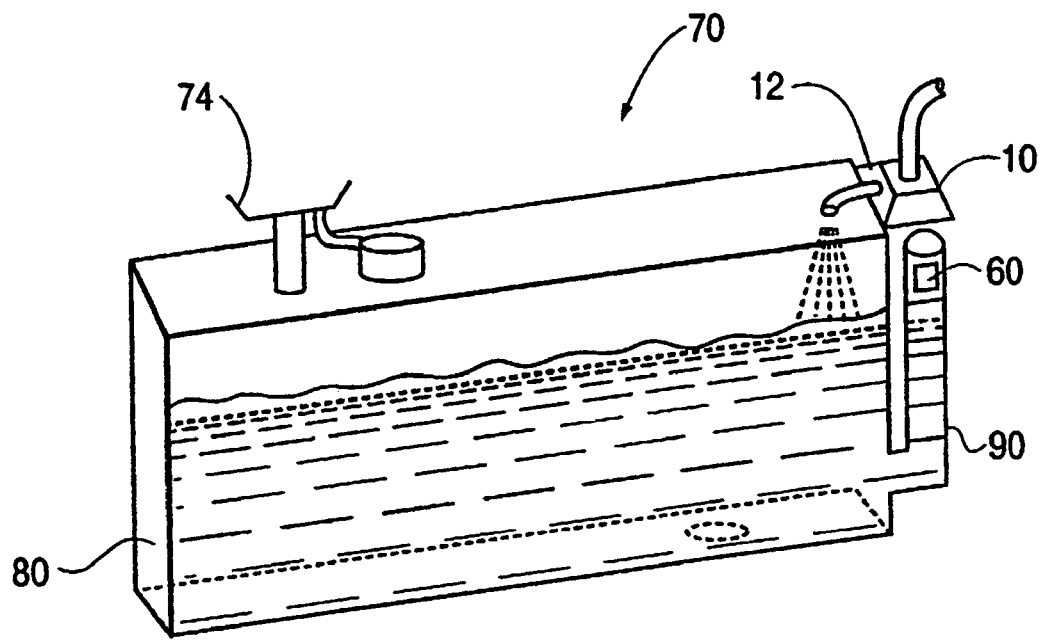
FIG. 4 is a perspective view of a waste tank.

At the end of a flight the waste tank 80 is sanitized. This process is typically performed by a ground crew using a lavatory cart 100 as shown in FIG. 3. Referring back to FIG. 2, waste is drained from the waste tank by opening the drain passage 82 valve. Waste is transferred to a holding tank on the lavatory cart 100. The drain passage 82 is then closed and the waste tank 80 filled with disinfectant fluid. Disinfectant fluid is added from a holding tank on the lavatory cart 100 to the waste tank 80 through the shut off valve 10. As the level of disinfectant fluid is rising within the waste tank 80, the magnetic actuator 60 is brought into proximity of the valve body 12 to close off the flow of disinfectant fluid as shown in FIG. 4. The automatic shut off provided by the magnetic actuator allows the ground crew to perform other tasks while the waste tank is being filled, without risking overfilling.

The lavatory system 70 may also include a tube 90 to house the magnetic actuator 60. The tube 90 is oriented alongside of the waste tank and liquid from the waste tank 80 can flow into the tube 90. In an embodiment of the invention, the tube 90 is next to the waste tank 80 and is mounted in a vertically canted manner. The level of the fluid within the tube 90 is directly proportional to the level of fluid within the waste tank 80. When the actuator is a float, the float moves in response to level changes in the fluid within the tube 90. The tube includes one or more vents near its top to allow air to enter and be expelled in order to avoid vacuum or over pressure conditions when fluid levels in the waste tank change. As the fluid level in the tank 80 reaches the top of the tank 80, the level of fluid in the tube causes the actuator 60 to get close enough to the shut off valve 10 to move the flapper body 40. The flapper body 40 is then assisted into the seal position by the fluid flowing through the valve 10 and flow into the tank 80 is stopped.

Additional advantages and modifications will readily appear to those skilled in the art. For example, different locations of the tube may be utilized. Different materials or composites may be used to form the shut off valve. Also, the shut off valve may be used in a vacuum transfer aircraft toilet system if disinfectant fluid is still used during service operations and there are ways where the disinfectant fluid can spill because of overfilling and cause problems. Therefore, the invention, in its broader aspects, is not limited to the specific details, the representative apparatus, and illustrative examples shown and described. Accordingly, departures may be made from such details without departing from the spirit or scope of the applicant's general inventive concept.

The invention claimed is:

1. A shut off valve for regulating fluid flow comprising:
    an inlet passage in intermittent fluid communication with an outlet passage;
    a flapper body movable between a rest position and a seal position between said inlet passage and said outlet passage; and
    an actuator that moves said flapper body from said rest position toward said seal position, wherein the actuator comprises a float adapted to change position based on a fluid level; wherein said flapper body is positioned so that inlet fluid flow assists said actuator in moving said flapper body into said seal position; and a bypass passage, in fluid communication with the outlet passage, that diverts a small portion of the fluid to rinse the actuator.

2. The shut off valve of claim 1 wherein said flapper body comprises a magnetic material.

3. The shut off valve of claim 1 wherein said flapper body is made from a non-magnetic material and includes one or more affixed magnets.

4. The shut off valve of claim 1 further including a reset device whereby when said actuator is not within the proximity of said flapper body, said flapper body is urged toward said rest position.

5. The shut off valve of claim 1 wherein said outlet passage further includes a check valve for preventing back flow.

6. The shut off valve of claim 1 wherein the actuator comprises a magnetic material.

7. The shut off valve of claim 6 further comprising a stationary electromagnet.

8. The shut off valve of claim 7 wherein the float is adapted to trigger the stationary electromagnet when the fluid level reaches a predetermined level.

* * * * *